United States Patent Office 3,466,259
Patented Sept. 9, 1969

3,466,259
THICKENED THERMOSETTING VINYL ESTER RESINS
Jack W. Jernigan, Lake Jackson, Tex., assignor to The Dow Chemical Company, Midland, Mich., a corporation of Delaware
No Drawing. Filed Dec. 15, 1966, Ser. No. 601,860
Int. Cl. C08g 45/04, 30/12
U.S. Cl. 260—37                    14 Claims

ABSTRACT OF THE DISCLOSURE

Thermosetting vinyl ester resin compositions which contain reactive carboxylic acid groups can be rapidly thickened by adding a Group II metal oxide or hydroxide and a catalytic amount of water. The resin compositions can be cured by the addition of a free radical catalyst and applying heat and/or pressure. A variety of reinforced plastic articles can be produced from the resin compositions.

---

The present invention relates to a method to rapidly thicken thermosetting vinyl ester resins, the resulting compositions and articles produced therefrom. More particularly, the rapid thickening is obtained by the admixture of (A) a metal oxide or hydroxide, wherein the metal is selected from Group II of the periodic chart, and (B) a catalytic amount of water, to (C) a vinyl ester resin composition containing reactive carboxylic acid groups.

The thickening of resins useful in preparing reinforced plastic articles frequently may take as long as two weeks or more to reach the physical state desired. All too frequently, the thickening over this period of time is also due to partial polymerization or curing of the resin which is not desired. Attempts to produce such thickened resins have resorted to the addition to the resin of inert ingredients such as silica aerogel or organic thickening agents. However, such thickened products are tacky, have little strength and reduce the manufacturer's ability to vary the properties of the cured resin.

It has been proposed, for example, in U.S. Patent No. 2,628,209, to incorporate magnesium oxide into unsaturated polyester resins blended with styrene and other polymerizable monomers. While thickening does occur, it is relatively slow even when elevated temperatures are employed. Additionally, the thickening effect was unique to magnesium oxide; other basic oxides or hydroxides were inoperative. It has also been proposed in British Patent No. 949,869 that further improvements can be made by forming Diels-Alder adducts of anthracene and the $\alpha,\beta$-olefinically unsaturated dicarboxylic acids used in the preparation of the unsaturated polyester. However, even after a four hour treatment at 70° C., it still requires about three to five days for completion of the thickening process when using magnesium oxide or beryllium oxide.

The present invention relates to a novel method for rapidly thickening a blend of a vinyl ester resin containing reactive carboxylic acid groups, to be more fully described, with a polymerizable monomer containing a $>C=CH_2$ group by the admixture of a catalytic amount of water in combination with a metal oxide or hydroxide, where the metal is selected from Group II of the periodic chart. Significantly, when no water is present, this rapid thickening does not occur and the resin compositions may remain fluid even after standing for several days. In contrast to the days and even weeks required by the prior art methods of thickening, the thickening action of the present invention frequently occurs in a matter of minutes.

Another feature of this invention is that the rapid thickening, in many instances, produces a firm, relatively non-tacky solid which can be stored, handled, cut to size, etc. before the final curing operation. Further, in applications where the vinyl ester resin is utilized without the polymerizable monomer, similar thickening effects are obtained.

The present invention is related to vinyl ester resins which contain reactive carboxylic acid groups and which are fully described in the copending application of David H. Swisher and David C. Garms, Ser. No. 597,233, filed on Nov. 28, 1966, and are fully incorporated into this application by reference.

Broadly defined, the vinyl ester resins of the present invention are prepared (1) by reacting a polyepoxide with an ethylenically unsaturated carboxylic acid to produce a reaction product which contains, in part, the functional group

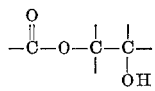

produced by the interaction of an epoxide group with a carboxylic acid group, and (2) by further condensation of the secondary hydroxyl groups contained in the above reaction product with a dicarboxylic acid anhydride to produce pendant half ester groups. The resulting vinyl ester resin may then be admixed with a polymerizable monomer containing a $>C=CH_2$ group. In the first stage of the resin preparation, the polyepoxide is added in an amount sufficient to provide about 0.8 to 1.2 equivalents of epoxide per equivalent of carboxylic acid. The reaction is completed by the addition of a dicarboxylic acid anhydride to form pendant half ester groups with the secondary alcohol group generated from the epoxide-carboxylic acid reaction. The proportion of this added dicarboxylic acid anhydride can be varied to convert from 10 percent to 100 percent of the secondary hydroxyl groups to pendant half ester groups.

Ethylenically unsaturated carboxylic acids suitable for reaction with the polyepoxide include the $\alpha,\beta$-unsaturated monocarboxylic acids and the hydroxyalkyl acrylate or methacrylate half esters of dicarboxylic acids. The $\alpha,\beta$-unsaturated monocarboxylic acids include acrylic acid, methacrylic acid, crotonic acid, cinnamic acid and the like. The hydroxylalkyl group of the acrylate or methacrylate half esters preferably contains from two to six carbon atoms and includes such groups as hydroxyethyl, beta-hydroxypropyl, beta-hydroxybutyl and the like. It is also intended to include those hydroxyalkyl groups in which an ether oxygen is present. The dicarboxylic acids can be either saturated or unsaturated. Saturated acids include phthalic acid, chlorendic acid, tetrabromophthalic acid, adipic acid, succinic acid, glutaric acid and the like. Unsaturated dicarboxylic acids include maleic acid, fumaric acid, citraconic acid, itaconic acid, halogenated maleic or fumaric acids, mesaconic acid and the like. Mixtures of ethylenically unsaturated carboxylic acids may be used.

Preferably, the half esters are prepared by reacting substantially equal molar proportions of a hydroxyalkyl acrylate or methacrylate with a dicarboxylic acid anhydride. Preferred unsaturated anhydrides include maleic anhydride, citraconic anhydride, itaconic anhydride and the like and preferred saturated anhydrides include phthalic anhydride, tetrabromophthalic anhydride, chlorendic anhydride and the like. Advantageously, a polymerization inhibitor, such as the methyl ether of hydroquinone or hydroquinone, may be added since elevated temperatures are useful in preparing the half esters.

Any of the known polyepoxides can be employed in the preparation of the vinyl ester resins of this invention. Useful polyepoxides are glycidyl polyethers of both polyhydric alcohols and polyhydric phenols, epoxy novolacs, epoxidized fatty acids or drying oil acids, epoxidized diolefins, epoxidized di-unsaturated acid esters, epoxidized unsaturated polyesters and mixtures thereof so long as they contain more than one epoxide group per molecule. The polyepoxides may be monomeric or polymeric.

While the invention is applicable to polyepoxides generally, preferred polyepoxides are glycidyl polyethers of polyhydric alcohols or polyhydric phenols having weights per epoxide group of 150 to 2,000. These polyepoxides are usually made by reacting at least about two moles of an epihalohydrin or glycerol dihalohydrin with one mole of the polyhydric alcohol or polyhydric phenol and a sufficient amount of a caustic alkali to combine with the halogen of the halohydrin. The products are characterized by the presence of more than one epoxide group, i.e., a 1,2-epoxy equivalency greater than one.

Suitable dicarboxylic acid anhydrides for reaction with the secondary hydroxyl groups include both the saturated anhydrides, such as phthalic anhydride, tetrabromophthalic anhydride, chlorendic anhydride and the like, and the $\alpha,\beta$-unsaturated dicarboxylic acid anhydrides, such as maleic anhydride, citraconic anhydride, itaconic anhydride and the like.

A wide selection of polymerizable monomers containing a $>C=CH_2$ group is available from the many known classes of vinyl monomers. Preferred polymerizable monomers are styrene, vinyl toluene, ortho-, meta- and para-halostyrenes, vinyl naphthalene, the various alpha-substituted styrenes, as well as the various di-, tri- and tetrahalo styrenes and acrylic, methacrylic and crotonic acid esters which include both the saturated alcohol esters and the hydroxyalkyl esters.

In the preparation of the vinyl ester resins, various inhibitors and catalysts may be used. Any of the well known vinyl polymerization inhibitors, such as hydroquinone or the methyl ether of hydroquinone and the like, may be used. Additionally, the reaction of the polyepoxide with the carboxylic acid may be conducted either in the presence or absence of a catalyst such as alcoholates, tertiary-amino phenols and the like.

According to the present invention, the highly desirable property of rapid thickening is obtained when finely divided magnesium oxide and a catalytic amount of water are admixed with a blend of the vinyl ester resin containing reactive carboxylic acid groups and a polymerizable monomer containing a $>C=CH_2$ group. The admixture of magnesium oxide without water with the vinyl ester resin composition, as previously proposed, was not successful in producing rapid thickening, but only resulted in a slight increase in the fluid viscosity. The critical and unexpected role of water was demonstrated using a resin composition which previously had resulted in only a slight viscosity increase upon the addition of MgO, whereby the addition of water to this same composition caused thickening in a matter of a few minutes.

The proportions of magnesium oxide and water in relation to the reactive carboxylic acid content of the resin composition influence the rate of thickening. It has been found by experiment that at least 0.75 equivalents of magnesium oxide (one molecular weight of MgO equals two equivalents) per equivalent of carboxylic acid (—COOH) and 0.25 equivalents of water (one molecular weight equals one equivalent) are necessary to achieve rapid thickening. Increasing the above ratios through the range of 1/1 to 5/1 equivalents per equivalent of —COOH greatly improves the thickening rate. Below this ratio of 1/1, the time for thickening to occur is progressively dramatically increased. Above the ratio of 5/1, the rate approaches a constant value. For rapid thickening, it is preferred to utilize one to five equivalents of magnesium oxide per equivalent of —COOH and one to five equivalents of water per equivalent of —COOH. For minimum tack characteristics of the thickened resin composition, a similar ratio of 1/1 to 5/1 equivalents of magnesium oxide or water per equivalent of —COOH is preferred.

Other metal oxides and hydroxides perform in a like manner to magnesium oxide. The oxides of calcium and zinc and the corresponding hydroxides of calcium and magnesium in combination with water result in rapid thickening. Of the group of metal oxides and hydroxides wherein the metal is selected from Group II of the periodic chart, magnesium oxide is preferred.

The thickening action is a function of temperature. As the temperature is increased above normal room temperature, the rate of thickening becomes more rapid until at about 80° C., the thickening rate approaches a constant value. While thickening does occur at room temperature, the preferred temperature range is 40°–70° C.

Additionally, the concentration of free carboxylic acid groups influences the rate of thickening and this concentration can be varied by the amount of polymerizable monomer blended with the vinyl ester resin, by the proportions of dicarboxylic acid anhydride used in the last stage of the vinyl ester resin preparation, or by utilizing polyepoxides with varying equivalent weights.

A series of resins was prepared and blended with styrene to a concentration of about 40 percent by weight styrene, wherein the reactive carboxylic acid concentration was varied from about 0.9 to 4.2 percent (—COOH) by weight. A dramatic decrease in the time for thickening to occur was found as the concentration of carboxylic acid groups increased, with the rate approaching a constant value in the range of carboxylic acid concentrations of 4–5 percent by weight. Generally, a preferred minimum carboxylic acid concentration of about 2 percent by weight was found.

Advantageously, a polymerizable monomer containing a $>C=CH_2$ group may be used in preparing the resin compositions of this invention. The concentration of the monomer may vary up to 70 percent by weight of the combined weight of the resin composition. Usually the addition of the monomer is desirable and a preferred monomer concentration ranges from about 30–60 percent by weight, based on total weight. However, some applications do not require the monomer and the vinyl ester resin can be thickened and cured without the monomer. If desired, suitable inert fillers, fibrous sheets, glass and other fibers or other reinforcing medium may be admixed wherein said additives may constitute up to as much as 75 percent by weight or more of the total weight of the composition.

According to the present invention, the curing of the resin compositions is effected by the application of heat and/or pressure in the presence of a free radical yielding catalyst. Catalysts that may be used for the curing or polymerization are preferably the peroxide catalysts, such as benzoyl peroxide, lauroyl peroxide, t-butyl hydroperoxide, t-butylperbenzoate, methyl ethyl ketone peroxide, potassium persulfate and the like. The amount of the catalyst added will preferably vary from 0.1 percent to about 5 percent by weight of reactants. Temperatures employed may vary over a considerable range but usually are in the range of 20° to 250° C.

Using suitable mixing or blending means, the thermosetting vinyl ester resin compositions of this invention are generally prepared by (1) admixture of the variously-recited additives, with the exception of the thickening agents, to the vinyl ester resin, followed by (2) admixture of the thickening agents, the metal oxide or hydroxide and water. Preferably, in the first stage, the vinyl ester resin is blended with the polymerizable monomer followed by admixture of the catalyst and other additives, such as inert fillers, glass fibers, pigments, accelerating agents, mole release agents, etc. Elevated temperatures may be used but, preferably, the mixing is performed at room temperature. A range of temperatures may be used in the second stage, but preferably, the mixture is heated to 40° to 70° C. before the addition of the thickening agents. It is possible to add the metal oxide or hydroxide at the first stage and obtain the thickening action by the addition of water, only, at the second stage. Those skilled in the art will recognize that other modifications of the method of preparation are possible without departing from the scope of the invention.

The time of thickening, as described in this application, was determined by the following test procedure: A high speed, low torque, air-driven stirrer (Aero Mix, Junior Model, Catalogue No. 65777, Precision Scientific Company, Chicago, Ill.) was used to mix the appropriate ingredients in a container, usually at 8 ounce glass bottle, which may be preheated and maintained at a preset temperature by positioning in a temperature controlled water bath. Most tests were conducted at 70° C. After the final addition of ingredients, the thickening time was observed and the time required to reduce the speed of stirring to one revolution per second was measured. Typically, 100 grams of, for example, styrene-blended resin was placed in an 8 ounce bottle and preheated to 70° C. The appropriate amount of metal oxide or hydroxide was added and blended for one minute with the stirrer set at 2,000 r.p.m. followed by the addition of an appropriate amount of water. The time of thickening was then measured. Test results were found to be very reproducible.

A viscosity relationship to the test end point (one revolution per second) was established by viscosity determinations on the resin and by calibration with other fluids. The viscosity at 70° C. at the above end point ranges from about 30,000 to 40,000 centipoises. Upon compositions develop viscosities of over $9 \times 10^6$ centipoises.

The tack-free time was determined in a somewhat similar manner. The resin was preheated and stirred as above, except a high speed, high torque stirrer (Gast Manufacturing Corporation, Model #1–AM–NCW–14, Benton Harbor, Mich.) set at 3,000 r.p.m. was used. The MgO was blended for one minute before the water addition. Ten seconds after the water is added, stirring is stopped and tackiness determined at 15 second intervals by inserting a wooden tongue depresser into the resin composition. The tack-free time is the time needed for the resin to become sufficiently tack-free so that it will not stick to the end of the wooden tongue depresser. This test also had good reproducibility.

These tests and others to be defined were used in determining the information in the following examples which illustrate, without limitation, methods of carrying out the present invention.

Example 1

(A) Into a reaction vessel equipped with a means for stirring, temperature control, refluxing, etc., were placed 13 lbs. of β-hydroxyethyl acrylate, 10.65 lbs. of maleic anhydride and 5.45 grams of mono-tertiarybutyl hydroquinone which serves as a polymerization inhibitor for the acrylate. The temperature was raised to 80° C., maintained at 80° C. for 30 minutes and then raised to 115° C. and held thereat until the percent acid as —COOH was about 20.95. After cooling to 60° C., 19 lbs. of a diglycidyl ether of 4,4'-isopropylidene diphenol (having an epoxide equivalent weight of about 175) was added along with 43.1 grams of DMP-30 (2,4,6-tri(dimethylaminomethyl)phenol). The temperature was raised to 110° C. and held at that temperature for such time until the percent acid (as —COOH) was 0.52 percent. After cooling to 73° C., 5.33 lbs. of maleic anhydride were added, the temperature raised to 100° C. and the reaction allowed to digest for about three hours to complete the reaction. At the conclusion of the reaction, the resin contained about 5.53 percent acid (—COOH) corresponding to about a 50 percent conversion of secondary hydroxyl groups to pendant maleate half ester groups. This resin, after cooling to 60° C., was blended with 32 lbs. styrene to give a final composition of about 40 percent by weight styrene and about 60 percent by weight of the above reaction product with an acid content of 3.3 percent (—COOH). Hereinafter, this resin will be called Resin A.

(B) By the same procedure as above, a series of resins with different acid concentrations was prepared by varying the amount of maleic anhydride used in the last stage of the reaction by which the secondary hydroxyl group is converted to a pendant half ester group. The resins, including Resin A, are described below in Table I and all contain about 40 percent by weight styrene.

TABLE I

| Resin | Weight percent acid (as —COOH) | Moles maleic anhydride used |
|---|---|---|
| A | 3.3 | 0.5 |
| B | 0.9 | 0.2 |
| C | 2.1 | 0.35 |
| D | 4.2 | 0.65 |
| E | 6.5 | 0.95 |
| F | 2.7 | 0.5 |

In each case, the moles of maleic anhydride used correspond to the approximate percent conversion of secondary hydroxyl groups to pendant half ester groups, e.g., Resin A (0.5 mole maleic anhydride) corresponds to about 50 percent conversion; Resin C (0.35 mole maleic anhydride) corresponds to about 35 percent conversion, etc.

(C) Several of the resins were prepared to contain 1 percent by weight benzoyl peroxide and were then thickened by the addition of two equivalents of MgO and one equivalent of water. Cured castings were made from these resins and tested for physical properties with the results shown in Table II.

TABLE II

| Casting properties | Resins prepared in Example 1 | | |
|---|---|---|---|
| | Resin B | Resin F | Resin C |
| Flex strength at 77° F., p.s.i.,[1] | 18,500 | 14,600 | 15,600 |
| and after 2 hr. water boil. | 13,300 | 15,000 | 15,400 |
| Flex modulus at 77° F. (×10⁵),[1] | 4.88 | 5.32 | 4.96 |
| and after 2 hr. water boil. | 4.67 | 4.85 | 4.07 |
| Heat distortion temperature, ° F.[2] | 211 | 220 | 215 |
| Toluene absorption 24 hr., percent [3] | 0.02 | 0.03 | 0.06 |
| Water absorption 24 hr., percent [3] | 0.17 | 0.28 | 0.2 |
| Tensile, p.s.i.[4] | 9,500 | 6,900 | 6,700 |
| Elongation, percent [4] | 2.4 | 1.7 | 1.4 |

[1] By ASTM D790-59T.
[2] By ASTM D648-6.
[3] By ASTM D570-59aT.
[4] By ASTM D638-58T.

Another formulation was made by blending one part of kaolin clay with one part of a resin prepared in a manner similar to Resin A except that hydroxypropyl acrylate was employed instead of hydroxyethyl acrylate and the polymerization inhibitor employed was hydroquinone instead of mono-tertiarybutyl hydroquinone and containing 1 percent by weight benzoyl peroxide, and then adding a mold release agent and two equivalents of MgO. After thorough mixing, about 75 parts of this formulation were blended with about 25 parts of ¼ inch glass fiber, wherein the glass fibers became evenly coated in about one minute due to the excellent glass wetting characteristics. The glass reinforced formulation was then allowed to thicken at room temperature. It was found that the water present in the clay was sufficient to catalyze the thickening action. The finished formulation was notable for its "dryness" or lack of tack and could be separated into small peices or retained as larger segments or mats as desired. The formulation also molded very well, filled out the die completely and the glass was distributed evenly throughout the cured article.

Example 2

Using Resin A, an attempt was made to thicken the resin by the admixture of magnesium oxide at various temperatures using different types of stirring. While some slight viscosity increases were noted, no appreciable thickening action occurred and no solid products produced.

The above test was repeated wherein the resin was heated to 70° C. and two equivalents of magnesium oxide per equivalent of —COOH were added. After blending for 60 seconds, one equivalent of water per equivalent of —COOH was added. Within 15 seconds (after blending with the water), noticeable thickening occurred and complete thickening, as measured by the previously-defined test, occurred in 1.1 minutes. After cooling, the resin composition was firm and tack-free, yet could be softened and molded simply by heating. Although the rate of thickening is somewhat slower than for MgO, similar thickening effects were observed when the magnesium oxide was replaced with zinc oxide, calcium hydroxide, magnesium hydroxide or calcium oxide.

Example 3

By means of the previously-defined thickening time test, the effect of the number of equivalents of magnesium oxide per equivalent of —COOH was determined using Resin D. Equivalents of MgO/—COOH varied from 0.8/1.0 to 2.0/1.0 and the tests were run at 70° C. with one equivalent of water per equivalent of —COOH present in all cases. A dramatic decrease in time of thickening occurred as the equivalents of MgO/—COOH approached 1/1. The results are summarized in Table III.

TABLE III

| Equivalents of MgO per equivalent of —COOH: | Thickening time, min. |
| --- | --- |
| 0.8/1 | 20 |
| 0.9/1 | 2¾ |
| 1/1 | 1½ |
| 1.5/1 | ¾ |
| 2/1 | ½ |

In a similar manner, the effect of higher loadings of MgO was determined with Resin C by varying the equivalents of MgO/—COOH from 4/1 to 8/1. The results are summarized in Table IV.

TABLE IV

| Equivalents of MgO per equivalent of —COOH: | Thickening time, min. |
| --- | --- |
| 4/1 | ¼ |
| 8/1 | ¼ |

The following example demonstrates that somewhat similar results were found when the equivalents of water were varied while holding the equivalents of MgO constant.

Example 4

In addition to rapid thickening, an important feature of the present invention is the preparation of essentially tack-free thermoplastic solids.

By means of the tack-free previously cited, the effect of the number of equivalents of water per equivalent of —COOH (H₂O/—COOH) was evaluated. The results shown in Table V were obtained with a resin similar to Resin A at a temperature of 80° C. and with two equivalents of magnesium oxide per equivalent of —COOH present in all cases.

TABLE V

| Equivalents H₂O/equivalents —COOH: | Tack-free time, min. |
| --- | --- |
| 0.5/1 | 3¼ |
| 1/1 | 2½ |
| 2/1 | 2¼ |
| 3/1 | 2¾ |
| 4/1 | 3¾ |

An optimum was noted at about a 2/1 ratio of H₂O/—COOH.

Example 5

By blending Resins B and D, resins were prepared wherein the acid concentration was varied from about 0.9 percent to 4.2 percent and the thickening time as a function of percent acid content (—COOH) was evaluated. All tests were made with two equivalents of magnesium oxide per equivalent of —COOH, one equivalent of water per equivalent of —COOH and the resin composition heated to 70° C. A decrease in thickening time was found as the percent acid content (—COOH) increased up to 2 to 3 percent. Additional improvement in the thickening rate occurred as the concentration of carboxylic acid was increased above 3 percent. Preferably, the carboxylic acid content should be above about 2 percent by weight.

When the maleic anhydride used in the final stage of the preparation of the resins of Example 1 is replaced with phthalic anhydride (in an amount sufficient to obtain a 40 percent conversion of the hydroxyl groups), similar thickening characteristics are obtained.

Example 6

Rapid thickening, similar to the previously-recited results, is obtained with the following vinyl ester resin compositions:

(a) The resin prepared from a maleate half ester of beta-hydroxypropyl acrylate and the polyepoxide of Example 1 followed by reaction with phthalic anhydride and then blended with styrene.

(b) The resin (a) above where methyl methacrylate is used in place of styrene.

(c) The resin (a) above where vinyl toluene is used in place of styrene.

(d) The resin (a) above where ortho-chlorostyrene is used in place of styrene.

(e) The resin prepared from acrylic acid and the polyepoxide of Example 1 followed by reaction with maleic anhydride and then blended with styrene.

(f) The resin (e) above where methacrylic acid is used in place of acrylic acid.

(g) The resin prepared from a maleate half ester of beta-hydroxyethyl acrylate and D.E.R. 736, a commercially available diglycidyl ether of a polyglycol having an epoxide equivaent weight of 175–205 followed by reaction with maleic anhydride and then blended with styrene.

The resin compositions of the present invention are of value in the preparation of pottings and castings and in the formation of various shaped articles. In the preparation of castings and pottings from these resin compositions, it is desirable to add a curing agent before the addition of the water and the said metal oxide or hydroxide without the application of elevated temperatures. It is then possible to pour the mixtures into the mold or casting and apply heat to accelerate the polymerization. The cured resin compositions have excellent tensile and flexural strength and solvent-resistant properties.

The thickened vinyl ester resin compositions have great utility in the reinforced plastics industry, especially in the area of matched die molding. The compositions can be prepared to contain a variety of additives such as inert fillers, which includes reinforcing media, clays and other minerals, glass fibers, fibers, cellulosics and the like; pigments; mold release agents and the like. Mats can be prepared which are essentially tack-free. Such mats can be stored, handled, cut to size, etc., and under molding conditions, flow well into the mold and allow shorter closure time. Frequently, lower molding pressures can be employed due to the improved flow properties. Those skilled in the art will recognize that other forms than mats may be produced; forms such as small integral pieces, coatings on a continuous fiber strand and the like.

Self-extinguishing or flame retardant properties can be obtained with the resins of this invention by the introduction of halogens or phosphorus and the like into the resins by well known means. For example, such properties can be incorporated into the vinyl ester resin itself by the use of a tetrabromo bisphenol in the preparation of a polyepoxide.

In addition, the resin composition of the present invention are valuable in the preparation of laminating compositions which may be applied to glass, wood, cloth, paper and the like.

It will be apparent to those skilled in the art that other methods of applying the principle of this invention may be employed without departure from the spirit of the invention or the scope of the appended claims.

I claim:
1. A thermosetting resin composition which comprises a resin produced by mixing
   (A) a blend of (1) up to 70 percent by weight of a polymerizable monomer containing a $>C=CH_2$ group, and (2) at least 30 percent by weight of a vinyl ester resin prepared (a) by reacting an ethylenically unsaturated monocarboxylic acid with a polyepoxide, and then (b) reacting a dicarboxylic acid anhydride with the secondary hydroxyl groups formed from the epoxide-carboxylic acid reaction to provide pendant half ester groups; said reactants combined in the proportion of 0.8 to 1.2 equivalents of epoxide per equivalent of carboxylic acid and 0.1 to 1.2 moles of dicarboxylic acid anhydride per equivalent of epoxide; and
   (B) a metal oxide or hydroxide, wherein the metal is selected from Group II of the periodic chart, in an amount sufficient to provide at least 0.75 equivalents per equivalent of carboxylic acid (—COOH); and
   (C) water in an amount sufficient to provide from at least 0.25 to about 5 equivalents of carboxylic acid (—COOH).
2. The composition of claim 1 wherein the metal is magnesium, calcium or zinc.
3. The composition of claim 1 wherein the equivalents of water vary from about one to five.
4. The composition of claim 1 wherein the equivalents of metal oxide or hydroxide vary from about one to five.
5. The composition of claim 1 wherein the catalytic amount of water is water of adsorption and is supplied to said resin composition by admixture of clay and other inert fillers.
6. A hard, solvent resistant resin comprising the product of polymerization of the composition of claim 1.
7. A thermosetting resin composition which comprises in admixture (a) up to about 75 percent by weight of an inert filler, (b) at least about 25 percent by weight of a resin consisting essentially of the composition of claim 1, and including (c) a catalytic amount of a free radical catalyst.
8. The composition of claim 7 wherein the filler is glass fiber.
9. A resin which comprises essentially the polymerized composition of claim 7.
10. A method of increasing the viscosity of a thermosetting resin composition which comprises mixing at least 0.75 equivalents of a metal oxide or hydroxide, where the metal is selected from Group II of the periodic chart, per equivalent of carboxylic acid (—COOH) and from at least 0.25 to about 5 equivalents of water per equivalent of carboxylic acid (—COOH) to a vinyl ester resin containing free carboxylic acid groups, said resin prepared by blending up to 70 parts of a polymerizable monomer containing a $>C=CH_2$ group with at least 30 parts of a polymerizable synthetic resin prepared (a) by reacting an ethylenically unsaturated monocarboxylic acid with a polyepoxide, and then (b) reacting a dicarboxylic acid anhydride with the secondary hydroxyl groups formed from the epoxide-carboxylic acid reaction to provide pendant half ester groups; said reactants combined in the proportion of 0.8 to 1.2 equivalents of epoxide per equivalent of carboxylic acid and 0.1 to 1.2 moles of dicarboxylic acid anhydride per equivalent of epoxide.
11. The method of claim 10 wherein the metal is magnesium, calcium or zinc.
12. The method of claim 10 wherein the equivalents of water vary from about one to five.
13. The method of claim 10 wherein the equivalents of metal oxide or hydroxide vary from one to five.
14. The method of claim 10 wherein the water is water of adsorption and is supplied to said resin composition by admixture of clay and other inert fillers.

References Cited
UNITED STATES PATENTS

| | | |
|---|---|---|
| 2,785,383 | 3/1957 | Foster. |
| 3,084,137 | 4/1963 | Nowlin et al. _____ 260—836 X |
| 3,268,477 | 8/1966 | Mueller. |

MORRIS LIEBMAN, Primary Examiner

L. T. JACOBS, Assistant Examiner

U.S. Cl. X.R.
260—41, 836, 837

PO-1050
(5/69)

UNITED STATES PATENT OFFICE
CERTIFICATE OF CORRECTION

Patent No. 3,466,259          Dated September 26, 1969

Inventor(s) Jack W. Jernigan

It is certified that error appears in the above-identified patent and that said Letters Patent are hereby corrected as shown below:

Col. 5, after line 34 insert --cooling and standing, many of these thickened resin--. Col. 7, line 58, insert --test-- after tack-free. Col. 9, line 33, insert --per equivalent-- after equivalents.

Other minor typographical errors were:

Col. 5, line 16, "at" should be "an"; line 35-36, "centipoi should be "centipoise"; line 41, "r.pm." should be "r.p.m."

SIGNED AND
SEALED
MAY 5 1970

(SEAL)
Attest:

Edward M. Fletcher, Jr.
Attesting Officer

WILLIAM E. SCHUYLER, JR.
Commissioner of Patents